(12) United States Patent
Lee et al.

(10) Patent No.: US 12,187,250 B2
(45) Date of Patent: Jan. 7, 2025

(54) ELECTRONIC PARKING BRAKE SYSTEM AND CONTROL METHOD THEREOF

(71) Applicant: HL MANDO CORPORATION, Pyeongtaek-si (KR)

(72) Inventors: Chan Won Lee, Gyeonggi-do (KR); Taewoong Oh, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 356 days.

(21) Appl. No.: 17/575,779

(22) Filed: Jan. 14, 2022

(65) Prior Publication Data

US 2022/0227345 A1  Jul. 21, 2022

(30) Foreign Application Priority Data

Jan. 18, 2021  (KR) .................. 10-2021-0006804

(51) Int. Cl.
    *B60T 13/74*     (2006.01)
(52) U.S. Cl.
    CPC .................. *B60T 13/741* (2013.01)
(58) Field of Classification Search
    CPC .................................................. B60T 13/741
    USPC ............ 188/156–162; 303/186, 190; 701/36
    See application file for complete search history.

(56) References Cited

U.S. PATENT DOCUMENTS

| | | | | |
|---|---|---|---|---|
| 7,328,955 | B2* | 2/2008 | Tsukasaki | B60T 8/1769 303/190 |
| 2014/0156141 | A1* | 6/2014 | Yabuguchi | B60T 13/74 701/36 |
| 2020/0156624 | A1 | 5/2020 | Witte | |
| 2024/0051506 | A1* | 2/2024 | Nam | B60T 7/122 |

FOREIGN PATENT DOCUMENTS

| | | |
|---|---|---|
| CN | 107074227 | 8/2017 |
| JP | 2015-193357 | 11/2015 |
| KR | 20-0127708 | 10/1998 |
| KR | 2003-0032621 | 4/2003 |

OTHER PUBLICATIONS

Office Action dated Jan. 27, 2024 for Chinese Patent Application No. 202210048081.7 and its English translation from Global Dossier.

* cited by examiner

*Primary Examiner* — Christopher P Schwartz
(74) *Attorney, Agent, or Firm* — Womble Bond Dickinson (US) LLP

(57) ABSTRACT

Disclosed is an electronic parking brake system including an electronic front-wheel parking brake provided on a front wheel side of a vehicle and configured to be operated by a front wheel motor, an electronic rear-wheel parking brake provided on a rear wheel side of the vehicle and configured to be operated by a rear wheel motor, a motor driving device configured to drive at least one of the front wheel motor and the rear wheel motor, and a controller electrically connected to the motor driving device, wherein the controller receives operation mode selection information in which an operation mode for operating at least one of the electronic front-wheel parking brake and the electronic rear-wheel parking brake is selected, and controls the motor driving device to operate at least one of the electronic front-wheel parking brake and the electronic rear-wheel parking brake in response to the operation mode of the received operation mode selection information.

16 Claims, 13 Drawing Sheets

ELECTRONIC PARKING BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2021-0006804, filed on Jan. 18, 2021, in the Korean Intellectual Property Office, the disclosure of which is incorporated by reference herein in its entirety.

BACKGROUND

1. Field

The disclosure relates to an electronic parking brake system for operating an electronic parking brake provided on a wheel of a vehicle and operated by a motor, and a control method thereof.

2. Description of the Related Art

In general, an electronic parking brake system includes an electronic parking brake having a motor, and a controller for driving the electronic parking brake, and the controller drives the electronic parking brake to generate a fastening force required for parking. For example, the electronic parking brake system increases a torque generated from the motor through a reducer to generate a fastening force required for parking by a mechanical structure device inside a caliper.

However, a conventional electronic parking brake system may not efficiently operate an electronic front-wheel parking brake and an electronic rear-wheel parking brake according to a selection of a driver when a braking compensation function is required, such as when the driver presses a brake pedal, in case of an emergency situation such as failure of a braking system and deterioration of braking performance, when the braking system is in braking operation that brakes or stops a vehicle while driving, and in case of failure of one of the electronic parking brakes.

SUMMARY

It is an aspect of the disclosure to provide an electronic parking brake system capable of efficiently operating an electronic front-wheel parking brake and an electronic rear-wheel parking brake according to a selection of driver, and a control method thereof.

Additional aspects of the disclosure will be set forth in part in the description which follows and, in part, will be obvious from the description, or may be learned by practice of the disclosure.

In accordance with an aspect of the disclosure, an electronic parking brake system includes an electronic front-wheel parking brake provided on a front wheel side of a vehicle and configured to be operated by a front wheel motor, an electronic rear-wheel parking brake provided on a rear wheel side of the vehicle and configured to be operated by a rear wheel motor, a motor driving device configured to drive at least one of the front wheel motor and the rear wheel motor, and a controller electrically connected to the motor driving device, wherein the controller receives operation mode selection information in which an operation mode for operating at least one of the electronic front-wheel parking brake and the electronic rear-wheel parking brake is selected, and controls the motor driving device to operate at least one of the electronic front-wheel parking brake and the electronic rear-wheel parking brake in response to the operation mode of the received operation mode selection information.

The controller may receive the operation mode selection information when braking the vehicle while driving or stopping the vehicle.

The operation mode of the operation mode selection information may be a first operation mode for operating the electronic front-wheel parking brake and the electronic rear-wheel parking brake, a second operation mode for operating the electronic front-wheel parking brake, or a third operation mode for operating the electronic rear-wheel parking brake.

When the operation mode of the operation mode selection information is the first operation mode, the controller may control a first motor driving device and a second motor driving device for respectively driving the front wheel motor, and control a third motor driving device and a fourth motor driving device for respectively driving the rear wheel motor.

When the operation mode of the operation mode selection information is the second operation mode, the controller may control a first motor driving device and a second motor driving device for respectively driving the front wheel motor.

When the operation mode of the operation mode selection information is the third operation mode, the controller may control a third motor driving device and a fourth motor driving device for respectively driving the rear wheel motor.

When the operation mode of the operation mode selection information is the first operation mode, the controller may receive wiring harness wiring connection information for the first operation mode, control a first motor driving device and a second motor driving device for respectively driving the front wheel motor based on first wiring harness wiring connection information for driving the front wheel motor in the received wiring harness wiring connection information, and control a third motor driving device and a fourth motor driving device for respectively driving the rear wheel motor based on second wiring harness wiring connection information for driving the rear wheel motor in the received wiring harness wiring connection information.

When the operation mode of the operation mode selection information is the second operation mode, the controller may receive wiring harness wiring connection information for the second operation mode, and control a first motor driving device and a second motor driving device for respectively driving the front wheel motor based on first wiring harness wiring connection information for driving the front wheel motor in the received wiring harness wiring connection information.

When the operation mode of the operation mode selection information is the third operation mode, the controller may receive wiring harness wiring connection information for the third operation mode, and control a third motor driving device and a fourth motor driving device for respectively driving the rear wheel motor based on second wiring harness wiring connection information for driving the rear wheel motor in the received wiring harness wiring connection information.

The controller may control the motor driving device based on at least one of parking switch operation information, brake pedal operation information, and braking information.

The electronic parking brake system may further include an operation mode selector provided to allow an operation mode of the operation mode selection information to be selected by a driver.

The operation mode selector may include an all wheels parking (AWP) switch provided to select a first operation mode for operating the electronic front-wheel parking brake and the electronic rear-wheel parking brake together, a front wheel parking (FWP) switch provided to select a second operation mode for operating only the electronic front-wheel parking brake, and a rear wheel parking (RWP) switch provided to select a third operation mode for operating only the electronic rear-wheel parking brake.

In accordance with an aspect of the disclosure, a control method of an electronic parking brake system, which includes an electronic front-wheel parking brake provided on a front wheel side of a vehicle and configured to be operated by a front wheel motor, and an electronic rear-wheel parking brake provided on a rear wheel side of the vehicle and configured to be operated by a rear wheel motor, includes receiving operation mode selection information in which an operation mode for operating at least one of the electronic front-wheel parking brake and the electronic rear-wheel parking brake is selected, driving at least one of a front wheel motor of the electronic front-wheel parking brake and a rear wheel motor of the electronic rear-wheel parking brake in response to the operation mode of the received operation mode selection information, and operating at least one of the electronic front-wheel parking brake and the electronic rear-wheel parking brake by driving at least one of the front wheel motor and the rear wheel motor.

The receiving of the operation mode selection information may include receiving at least one of a first operation mode for operating the electronic front-wheel parking brake and the electronic rear-wheel parking brake together, a second operation mode for operating only the electronic front-wheel parking brake, and a third operation mode for operating only the electronic rear-wheel parking brake.

The driving of at least one of the front wheel motor and the rear wheel motor may include determining whether the operation mode of the received operation mode selection information is the first operation mode, and controlling a first motor driving device and a second motor driving device for respectively driving the front wheel motor and controlling a third motor driving device and a fourth motor driving device for respectively driving the rear wheel motor, when the operation mode is the first operation mode.

The driving of at least one of the front wheel motor and the rear wheel motor may include determining whether the operation mode of the received operation mode selection information is the second operation mode, and controlling a first motor driving device and a second motor driving device for respectively driving the front wheel motor when the operation mode is the second operation mode.

The driving of at least one of the front wheel motor and the rear wheel motor may include determining whether the operation mode of the received operation mode selection information is the third operation mode, and controlling a third motor driving device and a fourth motor driving device for respectively driving the rear wheel motor when the operation mode is the third operation mode.

The driving of at least one of the front wheel motor and the rear wheel motor may include determining whether the operation mode of the received operation mode selection information is the first operation mode, receiving wiring harness wiring connection information for the first operation mode when the operation mode is the first operation mode, controlling a first motor driving device and a second motor driving device for respectively driving the front wheel motor based on first wiring harness wiring connection information for driving the front wheel motor in the received wiring harness wiring connection information, and controlling a third motor driving device and a fourth motor driving device for respectively driving the rear wheel motor based on second wiring harness wiring connection information for driving the rear wheel motor in the received wiring harness wiring connection information.

The driving of at least one of the front wheel motor and the rear wheel motor may include determining whether the operation mode of the received operation mode selection information is the second operation mode, receiving wiring harness wiring connection information for the second operation mode when the operation mode is the second operation mode, and controlling a first motor driving device and a second motor driving device for respectively driving the front wheel motor based on first wiring harness wiring connection information for driving the front wheel motor in the received wiring harness wiring connection information.

The driving of at least one of the front wheel motor and the rear wheel motor may include determining whether the operation mode of the received operation mode selection information is the third operation mode, receiving wiring harness wiring connection information for the third operation mode when the operation mode is the third operation mode, and controlling a third motor driving device and a fourth motor driving device for respectively driving the rear wheel motor based on second wiring harness wiring connection information for driving the rear wheel motor in the received wiring harness wiring connection information.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
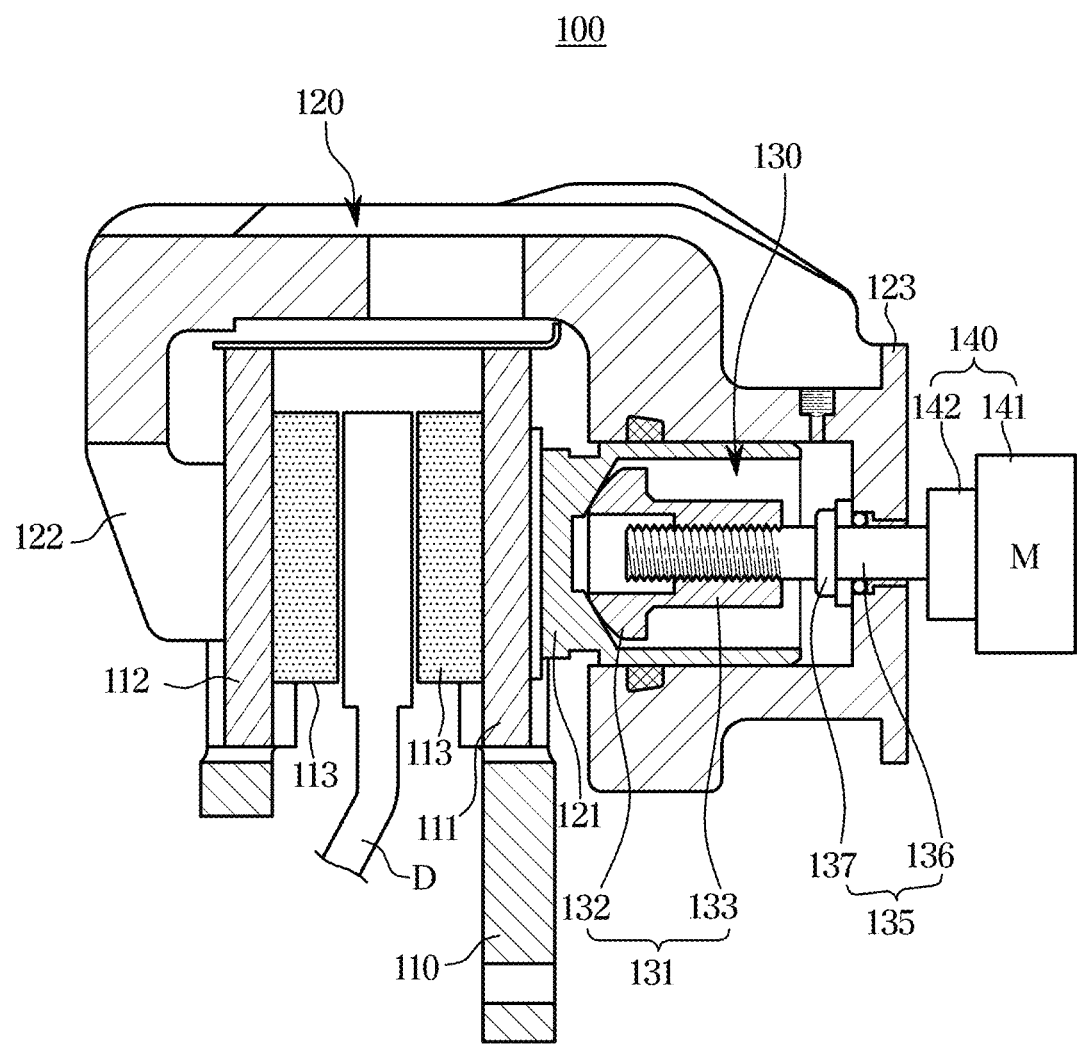
FIG. 1 illustrates a structure of an electronic parking brake included in an electronic parking brake system according to an embodiment.

Like reference numerals refer to like elements throughout the specification. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

FIG. 1 illustrates a structure of an electronic parking brake included in an electronic parking brake system according to an embodiment.

Referring to FIG. 1, an electronic parking brake 100 may include a carrier 110 on which a pair of pad plates 111 and 112 are installed to move forward or backward to press a brake disc D rotating together with a wheel of a vehicle, a caliper housing 120 provided with a cylinder 123 slidably installed on the carrier 110 and in which a piston 121 is installed to move forward or backward by a braking hydraulic pressure, a power conversion unit 130 to press the piston 121, and an actuator 140 to transmit a rotational force to the power conversion unit 130 using a motor 141.

The pair of pad plates 111 and 112 may be divided into the inner pad plate 111 disposed to be in contact with the piston 121 and the outer pad plate 112 disposed to be in contact with a finger part 122 of the caliper housing 120. The pair of pad plates 111 and 112 are installed on the carrier 110 fixed to a vehicle body so as to move forward or backward toward both sides of the brake disk D. In addition, a brake pad 113 may be attached to one surface of each of the pad plates 111 and 112 facing the brake disk D.

The caliper housing 120 may be slidably installed on the carrier 110. More specifically, the caliper housing 120 may include the cylinder 123 in which the power conversion unit 130 is installed at a rear portion thereof and the piston 121 moves forward or backward therein, and the finger part 122 formed in a front portion thereof to be bent in a downward direction so as to operate the outer pad plate 112. The finger part 122 and the cylinder 123 may be formed integrally.

The piston 121 may be provided in a cylindrical shape in which the inside thereof is recessed in a cup shape to be slidably inserted into the cylinder 123. The piston 121 may press the inner pad plate 111 to the brake disk D side by an axial force of the power conversion unit 130 receiving the rotational force of the EPB (electronic parking brake) actuator 140. Accordingly, when the axial force of the power conversion unit 130 is applied, the piston 121 moves forward to the inner pad plate 111 side to press the inner pad plate 111, and the caliper housing 120 operates in a direction opposite to the piston 121 by a reaction force so that the finger part 122 presses the outer pad plate 112 to the brake disk D side, thereby performing braking.

The power conversion unit 130 may perform a function of pressing the piston 121 toward the inner pad plate 111 by receiving the rotational force from the motor actuator 140.

The power conversion unit 130 may include a nut member 131 installed in the piston 121 to be in contact with the piston 121, and a spindle member 135 screwed to the nut member 131.

The nut member 131 may be disposed in the piston 121 in a state in which a rotation thereof is restricted to be screwed to the spindle member 135.

The nut member 131 may be formed by a head part 132 provided to be in contact with the piston 121, and a coupling part 133 formed extending from the head part 132 and having a female thread formed on an inner circumferential surface thereof to be screwed to the spindle member 135.

The nut member 131 may perform a function of pressing or releasing the piston 121 by moving in an advance direction or a reverse direction depending on a rotation direction of the spindle member 135. In this case, the advance direction may be a direction in which the nut member 131 moves to approach the piston 121. The reverse direction may be a direction in which the nut member 131 moves away from the piston 121. In addition, the advance direction may be a direction in which the piston 121 moves to approach the brake pad 113. The reverse direction may be a direction in which the piston 121 moves away from the brake pad 113.

The spindle member 135 may include a shaft part 136 penetrating the rear portion of the caliper housing 120 to rotate by receiving the rotational force of the EPB actuator 140, and a flange part 137 formed to extend in a radial direction from the shaft part 136. One side of the shaft part 136 may be rotatably installed to penetrate a rear side of the cylinder 123, and the other side of the shaft part 136 may be disposed in the piston 121. In this case, one side of the shaft part 136 penetrating the cylinder 123 is connected to an output shaft of a reducer 142 to receive the rotational force of the actuator 140.

The actuator 140 may include the motor 141 and the reducer 142.

The motor 141 may press or release the piston 121 by moving the nut member 131 forward or backward by rotating the spindle member 135.

The reducer 142 may be provided between the output side of the motor 141 and the spindle member 135.

By having the above configuration, the electronic parking brake 100 may move the nut member 131 to press the piston 121 by rotating the spindle member 135 in one direction using the actuator 140 in a parking operation mode. The piston 121 pressed by the movement of the nut member 131 presses the inner pad plate 111 to bring the brake pad 113 into close contact with the brake disk D, thereby generating a clamping force.

In addition, the electronic parking brake 100 rotates the spindle member 135 in the opposite direction using the motor actuator 140 in a parking release mode, so that the nut member 131 pressed against the piston 121 may move backward. The pressure applied to the piston 121 may be released by the backward movement of the nut member 131. As the pressure applied to the piston 121 is released, the brake pad 113 may be spaced apart from the brake disk D, thereby releasing the generated clamping force.

Figure 2:
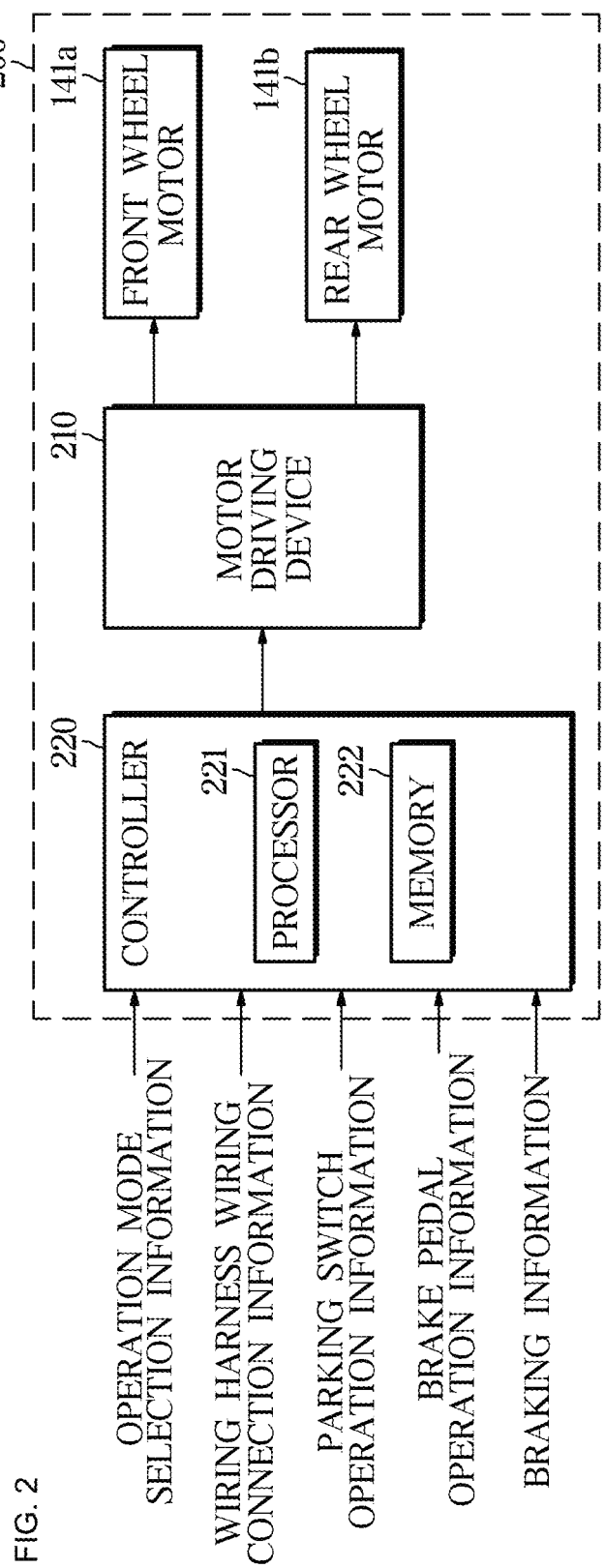
FIG. 2 illustrates a configuration of the electronic parking brake system according to an embodiment.

FIG. 2 illustrates a configuration of the electronic parking brake system according to an embodiment.

Referring to FIG. 2, an electronic parking brake system 200 may include a front wheel motor 141a, a rear wheel motor 141b, a motor driving device 210, and a controller 220. The controller 220 may receive operation mode selection information when braking the vehicle while driving or when stopping the vehicle.

Figure 3:
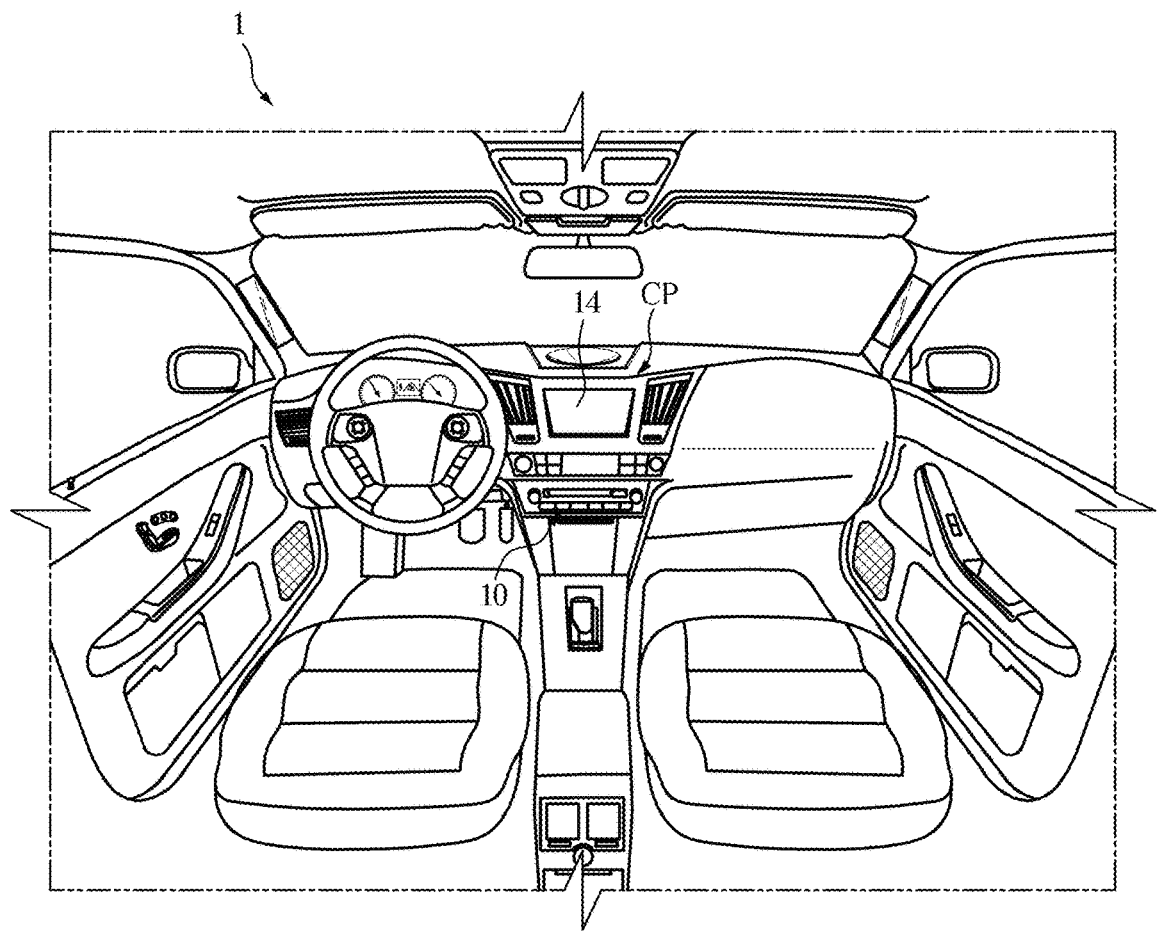
FIG. 3 illustrates an operation mode selector installed in a vehicle to which the electronic parking brake system according to an embodiment is applied.

FIG. 3 illustrates an operation mode selector installed in a vehicle to which the electronic parking brake system according to an embodiment is applied.

Referring to FIG. 3, an operation mode selector 10 may be installed on the center fascia CP provided inside the vehicle. The operation mode selector 10 may be provided to select an operation mode for operating at least one of an electronic front-wheel parking brake provided on a front wheel side and an electronic rear-wheel parking brake provided on a rear wheel side. The operation mode selector 10 is not limited thereto, and may be provided as a separate type switch inside the vehicle.

The operation mode selector 10 may be provided to select the operation mode when braking a vehicle 1 while driving or stopping the vehicle 1. For example, the operation mode selector 10 may select the operation mode when a braking compensation function is required for an operation of a brake pedal of a driver, and transmit brake pedal operation information to the controller 220 in response to the selected operation mode. The operation mode selector 10 may select the operation mode when the braking compensation function is required for an emergency situation such as failure of the braking system and deterioration of braking performance, and transmit braking information to the controller 220 in response to the selected operation mode. The operation mode selector 10 may select the operation mode when the braking compensation function is required for the braking performance of the braking system that brakes or stops during driving, and transmit the braking information to the controller 220 in response to the selected operation mode. The braking system may be an electro-hydraulic braking device, an integrated dynamic brake (IDB), an anti-lock braking system (ABS), an electronic stability control (ESC), a traction control system (TCS), or the like.

Figure 4:
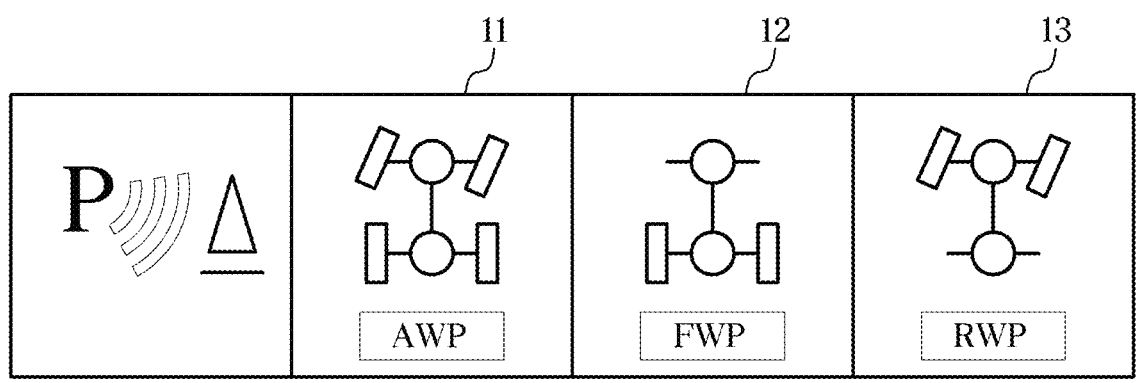
FIG. 4 illustrates a configuration of the operation mode selector illustrated in FIG. 3.

FIG. 4 illustrates a configuration of the operation mode selector illustrated in FIG. 3.

Referring to FIG. 4, the operation mode selector 10 may include an all wheels parking (AWP) switch 11 provided to select a first operation mode for operating the electronic front-wheel parking brake and the electronic rear-wheel parking brake, a front wheel parking (FWP) switch 12 provided to select a second operation mode for operating the electronic front-wheel parking brake, and a rear wheel parking (RWP) switch 13 provided to select a third operation mode for operating the electronic rear-wheel parking brake. The AWP switch 11, the FWP switch 12, and the RWP switch 13 may transmit a first switch signal for the first operation mode, a second switch signal for the second operation mode, or a third switch signal for the third operation mode to the controller 220 according to a selection of the driver. The operation mode selector 10 may be provided to select any one of an AWP display window, a FWP display window, and a RWP display window, which are displayed through a display panel 14 of the center fascia CP, instead of the AWP switch 11, the FWP switch 12, and the RWP switch 13.

Figure 5:
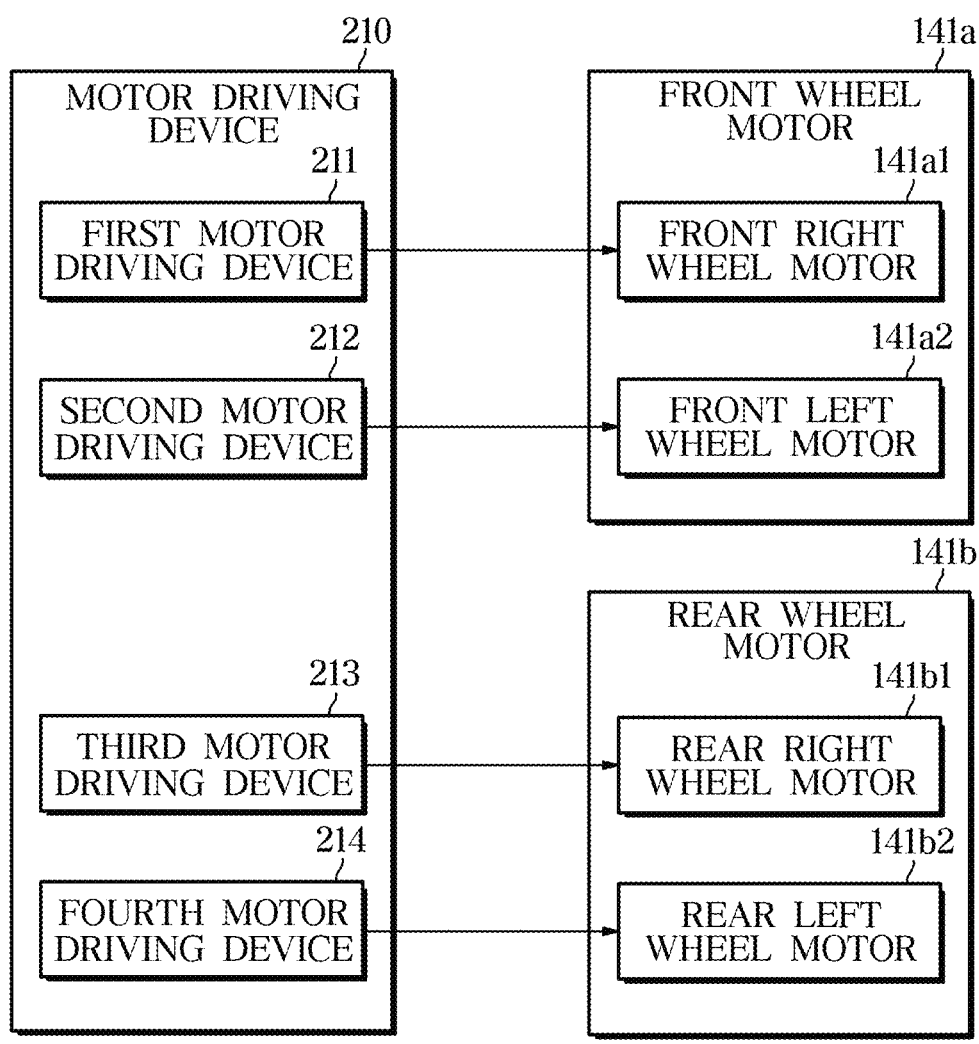
FIG. 5 illustrates configurations of a motor driving device, a front wheel motor, and a rear wheel motor of the electronic parking brake system according to an embodiment.

FIG. 5 illustrates configurations of a motor driving device, a front wheel motor, and a rear wheel motor of the electronic parking brake system according to an embodiment.

Referring to FIG. 5, the motor driving device 210 may drive at least one of the front wheel motor 141a and the rear wheel motor 141b. The motor driving device 210 may include a first motor driving device 211, a second motor driving device 212, a third motor driving device 213, and a fourth motor driving device 214. The front wheel motor 141a may be provided in the electronic front-wheel parking brake provided on the front wheel side. The front wheel motor 141a may include a front right wheel motor 141a1 and a front left wheel motor 141a2. The front right wheel motor 141a1 may be driven by the first motor driving device 211, and the front left wheel motor 141a2 may be driven by the second motor driving device 212. The rear wheel motor 141b may be provided in the electronic rear-wheel parking brake provided on the rear wheel side. The rear wheel motor 141b may include a rear right wheel motor 141b1 and a rear left wheel motor 141b2. The rear right wheel motor 141b1 may be driven by the third motor driving device 213, and the rear left wheel motor 141b2 may be driven by the fourth motor driving device 214.

The motor driving device 210 may drive the front wheel motor 141a and the rear wheel motor 141b in a forward rotation direction or a reverse rotation direction. For example, the motor driving device 210 may include an H-bridge circuit including a plurality of power switching devices to drive the front wheel motor 141a and the rear wheel motor 141b in the forward rotation direction or the reverse rotation direction.

The controller 220 may perform the parking operation mode or the parking release mode according to an operation signal of a parking switch operated by the driver or an operation signal generated by a program related to an operation of the electronic parking brake.

The controller 220 may press the piston 121 by moving the nut member 131 in the advance direction by rotating at least one of the front wheel motor 141a and the rear wheel motor 141b in one direction in the parking operation mode, thereby performing a parking operation (Apply) in which the brake pad 113 is brought into close contact with the brake disk D to generate a clamping force.

The controller 220 may release the piston 121 by moving the nut member 131 in the reverse direction by rotating at least one of the front wheel motor 141a and the rear wheel motor 141b in the opposite direction in the parking release mode, thereby performing a parking release (Release) in which the brake pad 113 being into close contact with the brake disk D is released to release the generated clamping force.

The electronic parking brake system 200 according to an embodiment allows the driver to select the operation mode for operating at least one of the electronic front-wheel parking brake and the electronic rear-wheel parking brake, so that the electronic front-wheel parking brake and the electronic rear-wheel parking brake are effectively operated according to a selection of the driver.

The controller 220 may include a processor 221 and a memory 222.

The processor 221 may control the motor driving device 210 to operate at least one of the electronic front-wheel parking brake and the electronic rear-wheel parking brake in response to the operation mode of the received operation mode selection information. The operation mode selector 10 may output the operation mode selection information including the first operation mode for operating the electronic front-wheel parking brake and the electronic rear-wheel parking brake, the second operation mode for operating the electronic front-wheel parking brake, or the third operation mode for operating the electronic rear-wheel parking brake.

When the received operation mode is the first operation mode, the processor 221 may control the first motor driving device 211 and the second motor driving device 212 for respectively driving the front wheel motor 141a, and may control the third motor driving device 213 and the fourth motor driving device 214 for respectively driving the rear wheel motor 141b. The first motor driving device 211 may drive the front right wheel motor 141a1, the second motor driving device 212 may drive the front left wheel motor 141a2, the third motor driving device 213 may drive the rear right wheel motor 141b1, and the fourth motor driving device 214 may drive the rear left wheel motor 141b2.

When the received operation mode is the second operation mode, the processor 221 may control the first motor driving device 211 and the second motor driving device 212 for respectively driving the front wheel motor 141a. The first motor driving device 211 may drive the front right wheel motor 141a1, the second motor driving device 212 may drive the front left wheel motor 141a2.

When the received operation mode is the third operation mode, the processor 221 may control the third motor driving device 213 and the fourth motor driving device 214 for respectively driving the rear wheel motor 141b. The third motor driving device 213 may drive the rear right wheel motor 141b1, and the fourth motor driving device 214 may drive the rear left wheel motor 141b2.

When the received operation mode is the first operation mode, the processor 221 may receive wiring harness wiring connection information for the first operation mode. For example, the processor 221 may request the wiring harness wiring connection information for the first operation mode from a smart junction box (SJB) controller to control a smart junction box. The smart junction box uses an intelligent power switch (IPS), which is a semiconductor device having the same function as a fuse and a relay, so that the smart junction box may be reduced in size and weight compared to a conventional junction box. The smart junction box (SJB) controller is increasingly being integrated into a body control module (BCM).

The smart junction box may be electrically connected to the first motor driving device 211 for driving the front right wheel motor 141a1, the second motor driving device 212 for driving the front left wheel motor 141a2, the third motor driving device 213 for driving the rear right wheel motor 141b1, and the fourth motor driving device 214 for driving the rear left wheel motor 141b2, through a wiring harness.

Such the SJB controller or BCM may improve vehicle stability with various failure monitoring functions and failure diagnosis functions. The SJB controller or BCM may monitor and diagnose an electrical connection state with each of the motor driving devices 211 to 214 through the processor and transmit each wiring harness wiring connection information for each of the operation modes to the controller 220. When an abnormal electrical connection state exists among the electrical connection states with the motor driving devices 211 to 214, the SJB controller or BCM may transmit wiring harness wiring connection information for the abnormal electrical connection state to the controller 220. When an abnormal electrical connection state exists among the electrical connection states with the motor driving devices 211 to 214, the SJB controller or BCM may adjust a wiring connection of the wiring harness for a normal electrical connection, and may transmit wiring harness wiring connection information for the normal electrical connection state to the controller 220 when the normal electrical connection is achieved through the adjusted wiring connection of the wiring harness. Instead of the SJB controller or BCM, each ECU for controlling the braking system (ABS, ESC, IDB, etc.) may directly perform a function of changing the wiring connection of the wiring harness.

The processor 221 may control the first motor driving device 211 and the second motor driving device 212 for respectively driving the front wheel motor 141a based on first wiring harness wiring connection information for driving the front wheel motor 141a in the received wiring harness wiring connection information. The processor 221 may identify the first wiring harness wiring connection information for the first operation mode and recognize the electrical connection state with the first motor driving device 211 and the electrical connection state with the second motor driving device 212. When the electrical connection state with the first motor driving device 211 and the electrical connection state with the second motor driving device 212 are normal, the processor 221 may control the first motor driving device 211 and the second motor driving device 212 for respectively driving the front wheel motor 141a. The first motor driving device 211 may drive the front right wheel motor 141a1, and the second motor driving device 212 may drive the front left wheel motor 141a2.

The processor 221 may control the third motor driving device 213 and the fourth motor driving device 214 for respectively driving the rear wheel motor 141b based on second wiring harness wiring connection information for driving the rear wheel motor 141b in the received wiring harness wiring connection information. The processor 221 may identify the second wiring harness wiring connection information for the first operation mode and recognize the electrical connection state with the third motor driving device 213 and the electrical connection state with the fourth motor driving device 214. When the electrical connection state with the third motor driving device 213 and the electrical connection state with the fourth motor driving device 214 are normal, the processor 221 may control the third motor driving device 213 and the fourth motor driving device 214 for respectively driving the rear wheel motor 141b. The third motor driving device 213 may drive the rear right wheel motor 141b1, and the fourth motor driving device 214 may drive the rear left wheel motor 141b2.

When the received operation mode is the second operation mode, the processor 221 may receive wiring harness wiring connection information for the second operation mode. The processor 221 may control the first motor driving device 211 and the second motor driving device 212 for respectively driving the front wheel motor 141a based on the first wiring harness wiring connection information for driving the front wheel motor 141a in the received wiring harness wiring connection information. The processor 221 may identify the first wiring harness wiring connection information for the second operation mode and recognize the electrical connection state with the first motor driving device 211 and the electrical connection state with the second motor driving device 212. When the electrical connection state with the first motor driving device 211 and the electrical connection state with the second motor driving device 212 are normal, the processor 221 may control the first motor driving device 211 and the second motor driving device 212 for respectively driving the front wheel motor 141a. The first motor driving device 211 may drive the front right wheel motor 141a1, and the second motor driving device 212 may drive the front left wheel motor 141a2.

When the received operation mode is the third operation mode, the processor 221 may receive wiring harness wiring connection information for the third operation mode. The processor 221 may control the third motor driving device 213 and the fourth motor driving device 214 for respectively driving the rear wheel motor 141b based on the second wiring harness wiring connection information for driving the rear wheel motor 141b in the received wiring harness wiring connection information. The processor 221 may identify the second wiring harness wiring connection information for the third operation mode and recognize the electrical connection state with the third motor driving device 213 and the electrical connection state with the fourth motor driving device 214. When the electrical connection state with the third motor driving device 213 and the electrical connection state with the fourth motor driving device 214 are normal, the processor 221 may control the third motor driving device 213 and the fourth motor driving device 214 for respectively driving the rear wheel motor 141b. The third motor driving device 213 may drive the rear right wheel motor 141b1, and the fourth motor driving device 214 may drive the rear left wheel motor 141b2.

The processor 221 may control the motor driving device 210 that drives at least one of the front wheel motor 141a and the rear wheel motor 141b based on at least one of the received parking switch operation information, brake pedal operation information, and braking information. In a situation where the processor 221 may receive the parking switch operation information and operate at least one of the electronic front-wheel parking brake and the electronic rear-wheel parking brake, the processor 221 may control the motor driving device 210 that drives at least one of the front wheel motor 141a and the rear wheel motor 141b to perform the braking compensation function, based on at least one of the brake pedal operation information and the braking information according to the selected operation mode.

The processor 221 may receive the parking switch operation information from the parking switch. The processor 221 may receive the brake pedal operation information from a brake pedal position sensor, and may receive the brake pedal operation information input or estimated from another system that performs CAN communication, which is an in-vehicle network, on behalf of the brake pedal position sensor. The processor 221 may receive the braking information input or estimated from a braking system performing CAN communication.

The processor 221 may include a signal processor for processing an operation mode selection signal, the wiring harness wiring connection information, the parking switch operation information, the brake pedal operation information, and the braking information, and a micro control unit (MCU) for generating a motor drive signal for actuating or deactivating the electronic parking brake 100.

The memory 222 may store a program and/or data for the processor 221 to process the operation mode selection signal, the wiring harness wiring connection information, the parking switch operation information, the brake pedal operation information, and the braking information, and a program and/or data for the processor 221 to generate the motor drive signal for actuating or deactivating the electronic parking brake 100.

The memory 222 may temporarily store the operation mode selection signal, the wiring harness wiring connection information, the parking switch operation information, the brake pedal operation information, and the braking information, and may temporarily store the result of processing the operation mode selection signal, the wiring harness wiring connection information, the parking switch operation information, the brake pedal operation information, and the braking information of the processor 221.

The memory 222 may include a non-volatile memory such as flash memory, read only memory (ROM), and erasable programmable read only memory (EPROM) as well as a volatile memory such as S-RAM and D-RAM.

Figure 6:
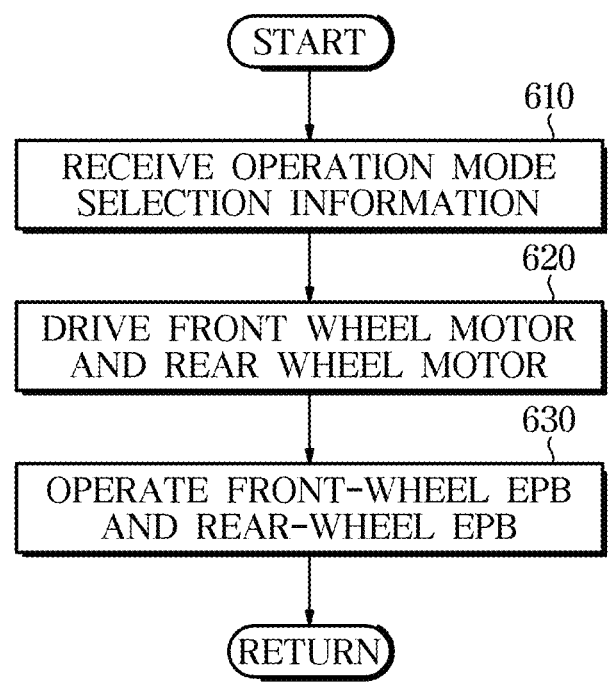
FIG. 6 illustrates an example of a control method of the electronic parking brake system according to an embodiment.

FIG. 6 illustrates an example of a control method of the electronic parking brake system according to an embodiment.

Referring to FIG. 6, the controller 220 may receive the operation mode selection information for operating at least one of the electronic front-wheel parking brake and the electronic rear-wheel parking brake (610). The operation mode selector 10 may select the operation mode for operating at least one of the electronic front-wheel parking brake and the electronic rear-wheel parking brake. The operation mode selector 10 may select the first operation mode for operating the electronic front-wheel parking brake and the electronic rear-wheel parking brake, the second operation mode for operating the electronic front-wheel parking brake, or the third operation mode for operating the electronic rear-wheel parking brake. The AWP switch 11 may transmit the first switch signal for the first operation mode to the controller 220, the FWP switch 12 may transmit the second switch signal for the second operation mode to the controller 220, and the RWP switch 13 may transmit the third switch signal for the third operation mode to the controller 220.

The controller 220 may drive at least one of the front wheel motor 141a of the electronic front-wheel parking brake and the rear wheel motor 141b of the electronic rear-wheel parking brake in response to the operation mode of the received operation mode selection information (620).

Figure 7:
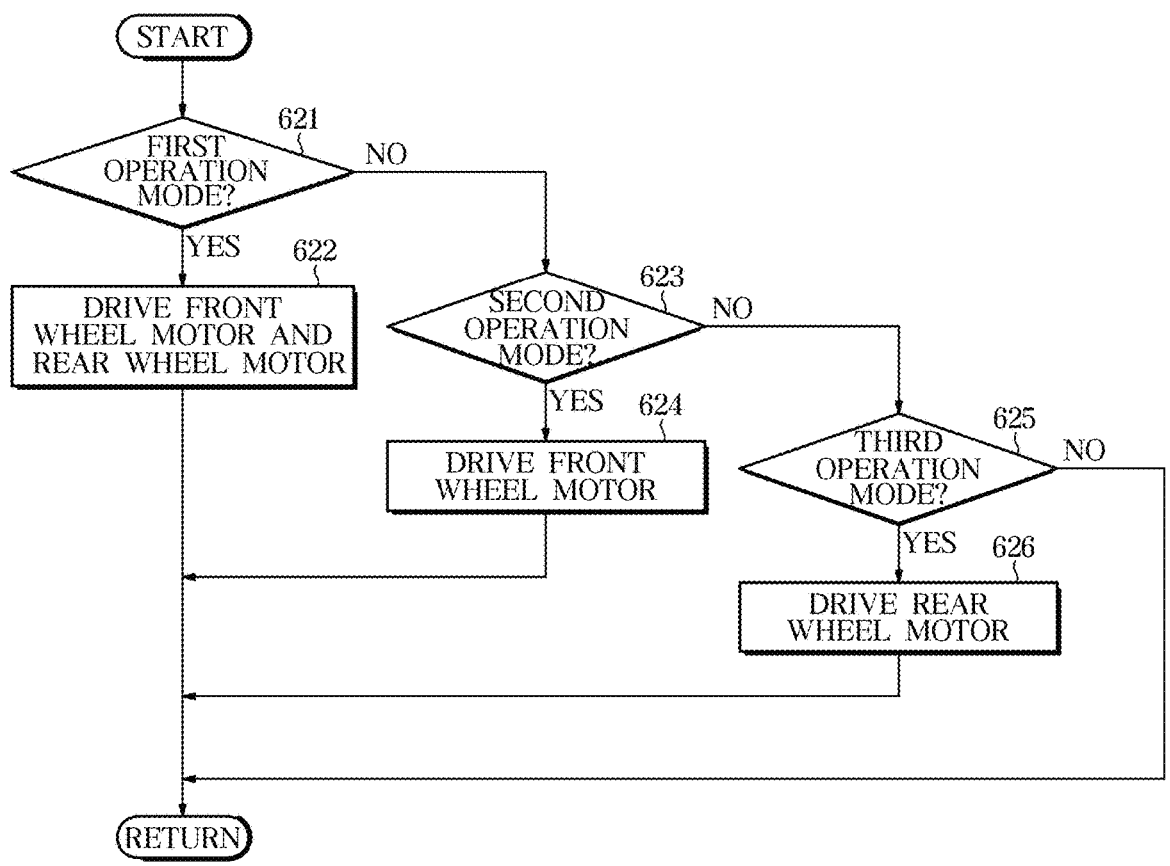
FIG. 7 illustrates a method of driving at least one of the front wheel motor and the rear wheel motor in the electronic parking brake system according to an embodiment.

FIG. 7 illustrates a method of driving at least one of the front wheel motor and the rear wheel motor in the electronic parking brake system according to an embodiment.

Referring to FIG. 7, the controller 220 may determine whether the operation mode of the received operation mode selection information is the first operation mode (621).

When the first switch signal for the first operation mode is received, the controller 220 may determine that the driver selects the AWP switch 11.

When the operation mode of the received operation mode selection information is the first operation mode, the controller 220 may control the first motor driving device 211 and the second motor driving device 212 for respectively driving the front right wheel motor 141a1 and the front left wheel motor 141a2, and may control the third motor driving device 213 and the fourth motor driving device 214 for respectively driving the rear right wheel motor 141b1 and the rear left wheel motor 141b2 (622).

When the operation mode of the received operation mode selection information is the first operation mode, the controller 220 may receive the wiring harness wiring connection information for the first operation mode.

Thereafter, the controller 220 may receive the first wiring harness wiring connection information for driving the front wheel motor 141a and the second wiring harness wiring connection information for driving the rear wheel motor 141b in the received wiring harness wiring connection information.

Thereafter, the controller 220 may control the first motor driving device 211 and the second motor driving device 212 for respectively driving the front right wheel motor 141a1 and the front left wheel motor 141a2 when the electrical connection state with the first motor driving device 211 and the electrical connection state with the second motor driving device 212 are normal based on the received first wiring harness wiring connection information, and may control the third motor driving device 213 and the fourth motor driving device 214 for respectively driving the rear right wheel motor 141b1 and the rear left wheel motor 141b2 when the electrical connection state with the third motor driving device 213 and the electrical connection state with the fourth motor driving device 214 are normal based on the received second wiring harness wiring connection information (622).

When it is not the first operation mode as a result of the determination in the operation mode 621, the controller 220 may determine whether the operation mode of the received operation mode selection information is the second operation mode (623). When the second switch signal for the second operation mode is received, the controller 220 may determine that the driver selects the FWP switch 12.

When the operation mode of the received operation mode selection information is the second operation mode, the controller 220 may control the first motor driving device 211 and the second motor driving device 212 for respectively driving the front right wheel motor 141a1 and the front left wheel motor 141a2 (624).

When the operation mode of the received operation mode selection information is the second operation mode, the controller 220 may receive the wiring harness wiring connection information for the second operation mode.

Thereafter, the controller 220 may receive the first wiring harness wiring connection information for driving the front wheel motor 141a in the received wiring harness wiring connection information.

Thereafter, when the electrical connection state with the first motor driving device 211 and the electrical connection state with the second motor driving device 212 are normal based on the received first wiring harness wiring connection information, the controller 220 may control the first motor driving device 211 and the second motor driving device 212 for respectively driving the front right wheel motor 141a1 and the front left wheel motor 141a2 (624).

When it is not the second operation mode as a result of the determination in the operation mode 623, the controller 220 may determine whether the operation mode of the received operation mode selection information is the third operation mode (625). When the third switch signal for the third operation mode is received, the controller 220 may determine that the driver selects the RWP switch 13.

When the operation mode of the received operation mode selection information is the third operation mode, the controller 220 may control the third motor driving device 213 and the fourth motor driving device 214 for respectively driving the rear right wheel motor 141b1 and the rear left wheel motor 141b2 (626).

When the operation mode of the received operation mode selection information is the third operation mode, the controller 220 may receive the wiring harness wiring connection information for the third operation mode.

Thereafter, the controller 220 may receive the second wiring harness wiring connection information for driving the rear wheel motor 141b in the received wiring harness wiring connection information.

Thereafter, when the electrical connection state with the third motor driving device 213 and the electrical connection state with the fourth motor driving device 214 are normal based on the received second wiring harness wiring connection information, the controller 220 may control the third motor driving device 213 and the fourth motor driving device 214 for respectively driving the rear right wheel motor 141b1 and the rear left wheel motor 141b2 (626).

When it is not the third operation mode as a result of the determination in the operation mode 625, the controller 220 may determine that the driver does not select the operation mode selector 10. The controller 220 may determine that the driver does not select the AWP switch 11, the FWP switch 12, or the RWP switch 13.

The controller 220 may operate at least one of the electronic front-wheel parking brake and the electronic rear-wheel parking brake by driving at least one of the front-wheel motor 141a and the rear-wheel motor 141b (630).

Figure 8:
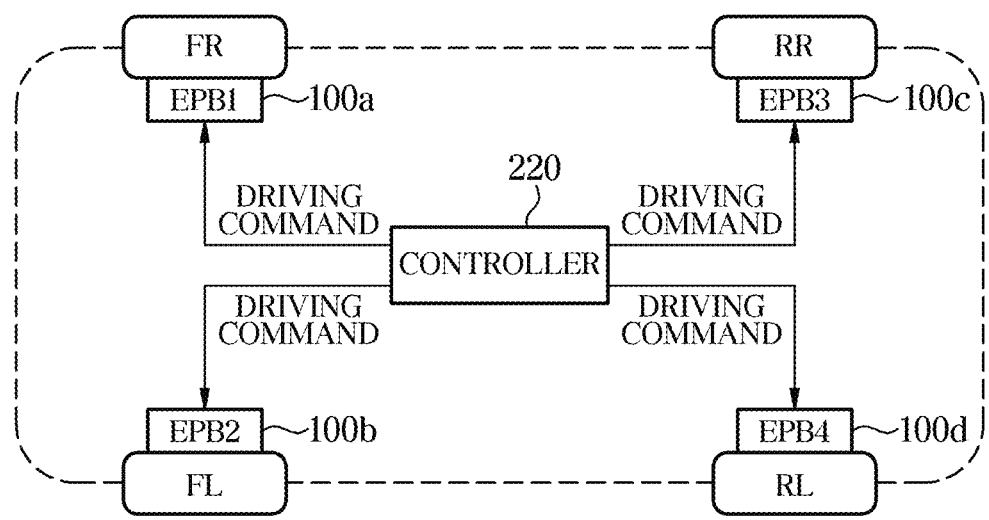
FIG. 8 illustrates, as an example, an operation of an electronic front-wheel parking brake and an electronic rear-wheel parking brake according to a first operation mode in the electronic parking brake system according to an embodiment.

FIG. 8 illustrates, as an example, an operation of an electronic front-wheel parking brake and an electronic rear-wheel parking brake according to a first operation mode in the electronic parking brake system according to an embodiment.

Referring to FIG. 8, when the operation mode of the received operation mode selection information is the first operation mode, the controller 220 may transmit a driving command to the first motor driving device 211, the second motor driving device 212, the third motor driving device 213, and the fourth motor driving device 214 to rotationally drive the front right wheel motor 141a1, the front left wheel motor 141a2, the rear right wheel motor 141b1, and the rear left wheel motor 141b2 in an operation direction so as to operate electronic front-wheel parking brakes 100a and 100b and electronic rear-wheel parking brakes 100c and 100d.

The first motor driving device 211, the second motor driving device 212, the third motor driving device 213, and the fourth motor driving device 214 may rotationally drive the front right wheel motor 141a1, the front left wheel motor 141a2, the rear right wheel motor 141b1, and the rear left wheel motor 141b2 in the operation direction to perform the braking compensation function based on at least one of the brake pedal operation information and the braking information according to the selected first operation mode.

The electronic front-wheel parking brakes 100*a* and 100*b* and the electronic rear-wheel parking brakes 100*c* and 100*d* may generate a clamping force necessary for braking the vehicle 1 while driving or for stopping the vehicle 1 by driving the front right wheel motor 141*a*1, the front left wheel motor 141*a*2, the rear right motor 141*b*1, and the rear left motor 141*b*2.

Figure 9:
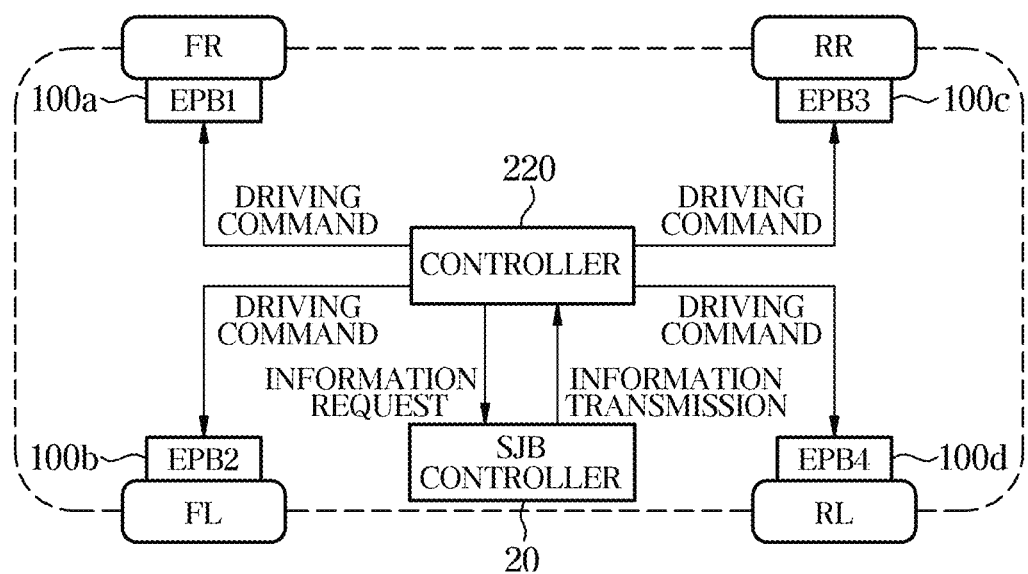
FIG. 9 illustrates, as another example, an operation of the electronic front-wheel parking brake and the electronic rear-wheel parking brake according to the first operation mode in the electronic parking brake system according to an embodiment.

FIG. 9 illustrates, as another example, an operation of the electronic front-wheel parking brake and the electronic rear-wheel parking brake according to the first operation mode in the electronic parking brake system according to an embodiment.

Referring to FIG. 9, when the operation mode of the received operation mode selection information is the first operation mode, the controller 220 may receive the wiring harness wiring connection information for the first operation mode.

Thereafter, when the electrical connection state with the first motor driving device 211, the electrical connection state with the second motor driving device 212, the electrical connection state with the third motor driving device 213, and the electrical connection state with the fourth motor driving device 214 are normal based on the first wiring harness wiring connection information and the second wiring harness wiring connection information for driving the front wheel motor 141*a* and the rear wheel motor 141*b* in the received wiring harness wiring connection information, the controller 220 may transmit a driving command to the first motor driving device 211, the second motor driving device 212, the third motor driving device 213, and the fourth motor driving device 214 to rotationally drive the front right wheel motor 141*a*1, the front left wheel motor 141*a*2, the rear right wheel motor 141*b*1, and the rear left wheel motor 141*b*2 in the operation direction so as to operate the electronic front-wheel parking brakes 100*a* and 100*b* and the electronic rear-wheel parking brakes 100*c* and 100*d*.

The first motor driving device 211, the second motor driving device 212, the third motor driving device 213, and the fourth motor driving device 214 may rotationally drive the front right wheel motor 141*a*1, the front left wheel motor 141*a*2, the rear right wheel motor 141*b*1, and the rear left wheel motor 141*b*2 in the operation direction to perform the braking compensation function based on at least one of the brake pedal operation information and the braking information according to the selected first operation mode.

The electronic front-wheel parking brakes 100*a* and 100*b* and the electronic rear-wheel parking brakes 100*c* and 100*d* may generate a clamping force necessary for braking the vehicle 1 while driving or for stopping the vehicle 1 by driving the front right wheel motor 141*a*1, the front left wheel motor 141*a*2, the rear right motor 141*b*1, and the rear left motor 141*b*2.

Figure 10:
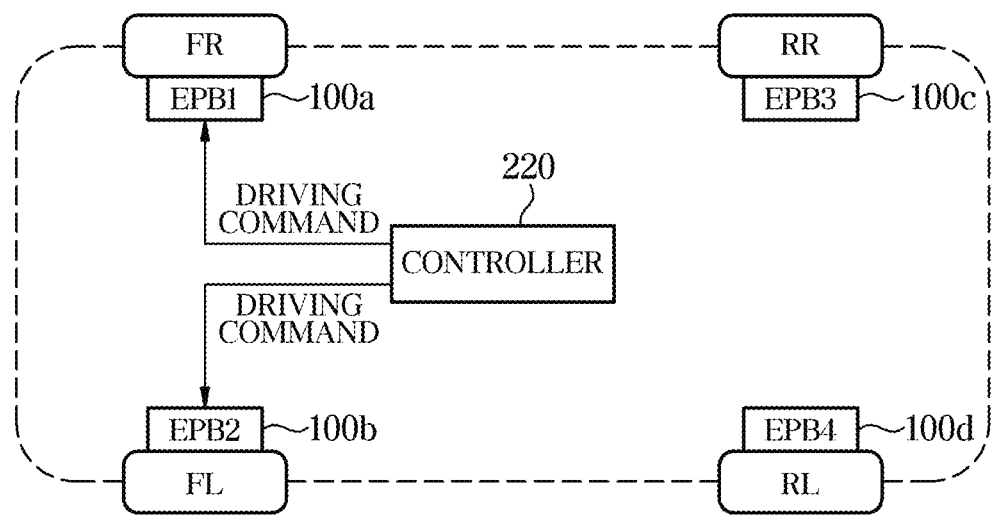
FIG. 10 illustrates, as an example, an operation of the electronic front-wheel parking brake according to a second operation mode in the electronic parking brake system according to an embodiment.

FIG. 10 illustrates, as an example, an operation of the electronic front-wheel parking brake according to a second operation mode in the electronic parking brake system according to an embodiment.

Referring to FIG. 10, when the operation mode of the received operation mode selection information is the second operation mode, the controller 220 may transmit a driving command to the first motor driving device 211 and the second motor driving device 212 to rotationally drive the front right wheel motor 141*a*1 and the front left wheel motor 141*a*2 in the operation direction so as to operate the electronic front-wheel parking brakes 100*a* and 100*b*.

The first motor driving device 211 and the second motor driving device 212 may rotationally drive the front right wheel motor 141*a*1 and the front left wheel motor 141*a*2 in the operation direction to perform the braking compensation function based on at least one of the brake pedal operation information and the braking information according to the selected second operation mode.

The electronic front-wheel parking brakes 100*a* and 100*b* may generate a clamping force necessary for stopping the vehicle 1 by driving the front right wheel motor 141*a*1 and the front left wheel motor 141*a*2.

Figure 11:
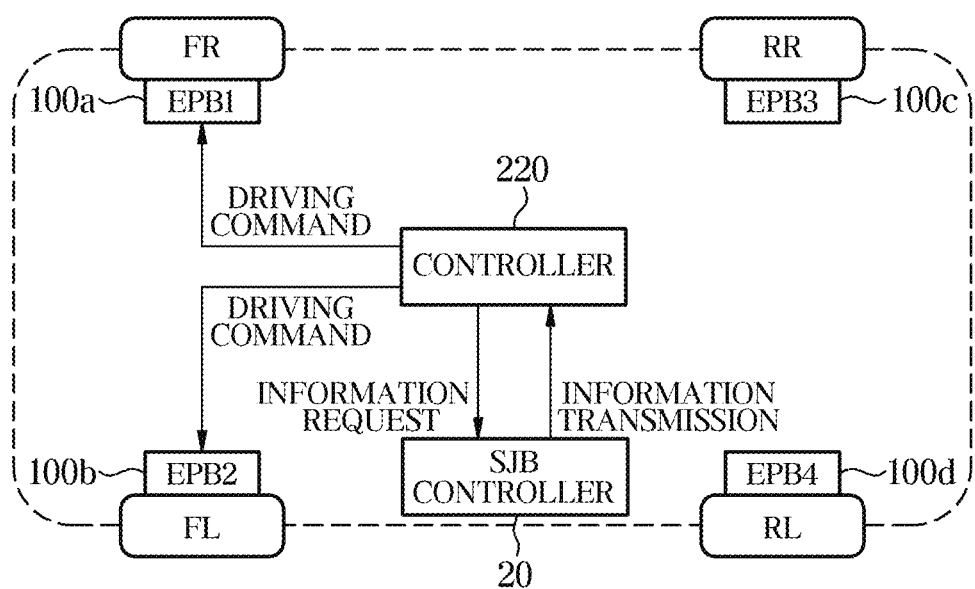
FIG. 11 illustrates, as another example, an operation of the electronic front-wheel parking brake according to the second operation mode in the electronic parking brake system according to an embodiment.

FIG. 11 illustrates, as another example, an operation of the electronic front-wheel parking brake according to the second operation mode in the electronic parking brake system according to an embodiment.

Referring to FIG. 11, when the operation mode of the received operation mode selection information is the second operation mode, the controller 220 may receive the wiring harness wiring connection information for the second operation mode.

Thereafter, when the electrical connection state with the first motor driving device 211 and the electrical connection state with the second motor driving device 212 are normal based on the first wiring harness wiring connection information for driving the front wheel motor 141*a* in the received wiring harness wiring connection information, the controller 220 may transmit a driving command to the first motor driving device 211 and the second motor driving device 212 to rotationally drive the front right wheel motor 141*a*1 and the front left wheel motor 141*a*2 in the operation direction so as to operate the electronic front-wheel parking brakes 100*a* and 100*b*.

The first motor driving device 211 and the second motor driving device 212 may rotationally drive the front right wheel motor 141*a*1 and the front left wheel motor 141*a*2 in the operation direction to perform the braking compensation function based on at least one of the brake pedal operation information and the braking information according to the selected second operation mode.

The electronic front-wheel parking brakes 100*a* and 100*b* may generate a clamping force necessary for braking the vehicle 1 while driving or for stopping the vehicle 1 by driving the front right wheel motor 141*a*1 and the front left wheel motor 141*a*2.

Figure 12:
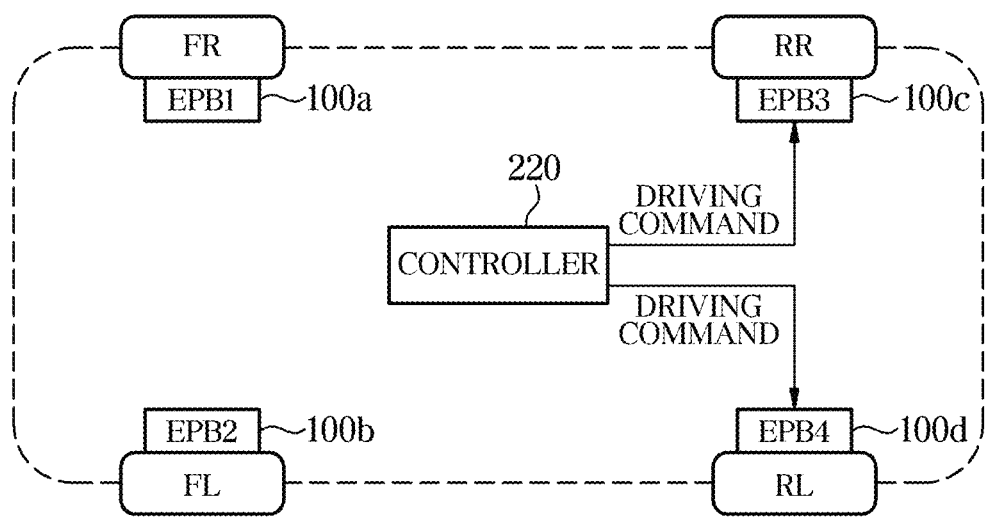
FIG. 12 illustrates, as an example, an operation of the electronic rear-wheel parking brake according to a third operation mode in the electronic parking brake system according to an embodiment.

FIG. 12 illustrates, as an example, an operation of the electronic rear-wheel parking brake according to a third operation mode in the electronic parking brake system according to an embodiment.

Referring to FIG. 12, when the operation mode of the received operation mode selection information is the third operation mode, the controller 220 may transmit a driving command to the third motor driving device 213 and the fourth motor driving device 214 to rotationally drive the rear right wheel motor 141*b*1 and the rear left wheel motor 141*b*2 in the operation direction so as to operate the electronic rear-wheel parking brakes 100*c* and 100*d*.

The third motor driving device 213 and the fourth motor driving device 214 may rotationally drive the rear right wheel motor 141*b*1 and the rear left wheel motor 141*b*2 in the operation direction to perform the braking compensation function based on at least one of the brake pedal operation information and the braking information according to the selected third operation mode.

The electronic rear-wheel parking brakes 100*c* and 100*d* may generate a clamping force necessary for braking the vehicle 1 while driving or for stopping the vehicle 1 by driving the rear right wheel motor 141*b*1 and the rear left wheel motor 141*b*2.

Figure 13:
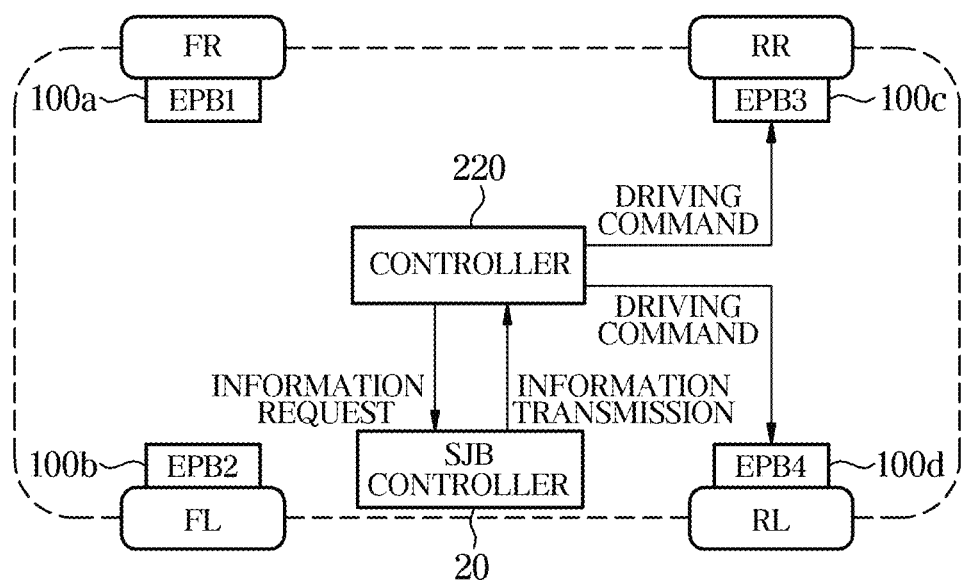
FIG. 13 illustrates, as another example, an operation of the electronic rear-wheel parking brake according to the third operation mode in the electronic parking brake system according to an embodiment.

FIG. 13 illustrates, as another example, an operation of the electronic rear-wheel parking brake according to the third operation mode in the electronic parking brake system according to an embodiment.

Referring to FIG. 13, when the operation mode of the received operation mode selection information is the third operation mode, the controller 220 may receive the wiring harness wiring connection information for the third operation mode.

Thereafter, when the electrical connection state with the third motor driving device 213 and the electrical connection state with the fourth motor driving device 214 are normal based on the second wiring harness wiring connection information for driving the rear wheel motor 141b in the received wiring harness wiring connection information, the controller 220 may transmit a driving command to the third motor driving device 213 and the fourth motor driving device 214 to rotationally drive the rear right wheel motor 141b1 and the rear left wheel motor 141b2 in the operation direction so as to operate the electronic rear-wheel parking brakes 100c and 100d.

The third motor driving device 213 and the fourth motor driving device 214 may rotationally drive the rear right wheel motor 141b1 and the rear left wheel motor 141b2 in the operation direction to perform the braking compensation function based on at least one of the brake pedal operation information and the braking information according to the selected third operation mode.

The electronic rear-wheel parking brakes 100c and 100d may generate a clamping force necessary for braking the vehicle 1 while driving or for stopping the vehicle 1 by driving the rear right wheel motor 141b1 and the rear left wheel motor 141b2.

As described above, the electronic parking brake system 200 according to an embodiment may allow the driver to select the operation of the electronic front-wheel parking brake and the operation of the electronic rear-wheel parking brake when the braking compensation function is required for the operation of the brake pedal of the driver, when the brake compensation function is required for an emergency situation such as failure of the brake system and deterioration of brake performance, when the brake compensation function is required for the braking performance of the braking system that brakes or stops while driving, and when the brake compensation function is required for the failure of the electronic parking brake on one side, thereby efficiently operating the electronic front-wheel parking brake and the electronic rear-wheel parking brake according to a selection of the driver.

As is apparent from the above, according to one aspect of the disclosure, an electronic front-wheel parking brake and an electronic rear-wheel parking brake can be efficiently operated according to a selection of a driver.

What is claimed is:

1. An electronic parking brake system comprising:
an electronic front-wheel parking brake provided on a front wheel side of a vehicle and configured to be operated by a front wheel motor;
an electronic rear-wheel parking brake provided on a rear wheel side of the vehicle and configured to be operated by a rear wheel motor;
a motor drive configured to drive at least one of the front wheel motor and the rear wheel motor; and
a controller electrically connected to the motor drive, wherein:
the controller receives operation mode selection information in which an operation mode for operating at least one of the electronic front-wheel parking brake and the electronic rear-wheel parking brake is selected, and controls the motor drive to operate at least one of the electronic front-wheel parking brake and the electronic rear-wheel parking brake in response to the operation mode of the received operation mode selection information,
the operation mode of the operation mode selection information is at least one of a first operation mode for operating the electronic front-wheel parking brake and the electronic rear-wheel parking brake, a second operation mode for operating the electronic front-wheel parking brake, or a third operation mode for operating the electronic rear-wheel parking brake, and
the controller is configured to, when the operation mode of the operation mode selection information is the second operation mode, control a first motor drive and a second motor drive for driving the front wheel motor.

2. The electronic parking brake system according to claim 1, further comprising
an operation mode selector configured to allow an operation mode of the operation mode selection information to be selected by a driver.

3. The electronic parking brake system according to claim 2, wherein
the operation mode selector comprises an all wheels parking (AWP) switch provided to select the first operation mode for operating the electronic front-wheel parking brake and the electronic rear-wheel parking brake together, a front wheel parking (FWP) switch provided to select the second operation mode for operating only the electronic front-wheel parking brake, and a rear wheel parking (RWP) switch provided to select the third operation mode for operating only the electronic rear-wheel parking brake.

4. The electronic parking brake system according to claim 1, wherein
the controller receives the operation mode selection information when braking the vehicle while driving or stopping the vehicle.

5. The electronic parking brake system according to claim 1, wherein
the controller is configured to, when the operation mode of the operation mode selection information is the first operation mode, control the first motor drive and the second motor drive for driving the front wheel motor and control a third motor drive and a fourth motor drive for driving the rear wheel motor.

6. The electronic parking brake system according to claim 1, wherein
the controller is configured to, when the operation mode of the operation mode selection information is the first operation mode,
receive wiring harness wiring connection information for the first operation mode,
control the first motor drive and the second motor drive for driving the front wheel motor based on first wiring harness wiring connection information for driving the front wheel motor in the received wiring harness wiring connection information, and
control a third motor drive and a fourth motor drive for driving the rear wheel motor based on second wiring harness wiring connection information for driving the rear wheel motor in the received wiring harness wiring connection information.

7. The electronic parking brake system according to claim 1, wherein
the controller is configured to, when the operation mode of the operation mode selection information is the second operation mode,
receive wiring harness wiring connection information for the second operation mode, and
control the first motor drive and a second motor drive for driving the front wheel motor based on first wiring harness wiring connection information for driving the front wheel motor in the received wiring harness wiring connection information.

8. The electronic parking brake system according to claim 1, wherein
the controller is configured to, when the operation mode of the operation mode selection information is the third operation mode,
receive wiring harness wiring connection information for the third operation mode, and
control a third motor drive and a fourth motor drive for driving the rear wheel motor based on second wiring harness wiring connection information for driving the rear wheel motor in the received wiring harness wiring connection information.

9. The electronic parking brake system according to claim 1, wherein
the controller is configured to control the motor drive based on at least one of parking switch operation information, brake pedal operation information, and braking information.

10. A control method of an electronic parking brake system comprising an electronic front-wheel parking brake provided on a front wheel side of a vehicle and configured to be operated by a front wheel motor, and an electronic rear-wheel parking brake provided on a rear wheel side of the vehicle and configured to be operated by a rear wheel motor,
wherein the control method comprises:
receiving operation mode selection information in which an operation mode for operating at least one of the electronic front-wheel parking brake and the electronic rear-wheel parking brake is selected, wherein the operation mode of the operation mode selection information is at least one of a first operation mode for operating the electronic front-wheel parking brake and the electronic rear-wheel parking brake, a second operation mode for operating the electronic front-wheel parking brake, or a third operation mode for operating the electronic rear-wheel parking brake, and;
driving at least one of a front wheel motor of the electronic front-wheel parking brake and a rear wheel motor of the electronic rear-wheel parking brake in response to the operation mode of the received operation mode selection information; and
operating at least one of the electronic front-wheel parking brake and the electronic rear-wheel parking brake by driving at least one of the front wheel motor and the rear wheel motor,
wherein the driving of at least one of the front wheel motor and the rear wheel motor comprises, when the operation mode is the second operation mode, controlling a first motor drive and a second motor drive for driving the front wheel motor.

11. The control method according to claim 10, wherein the driving of at least one of the front wheel motor and the rear wheel motor comprises:
when the operation mode is the first operation mode, controlling the first motor drive and the second motor drive for driving the front wheel motor and controlling a third motor drive and a fourth motor drive for driving the rear wheel motor.

12. The control method according to claim 10, wherein the driving of at least one of the front wheel motor and the rear wheel motor comprises:
when the operation mode is the third operation mode, controlling a third motor drive and a fourth motor drive for driving the rear wheel motor.

13. The control method according to claim 10, wherein the driving of at least one of the front wheel motor and the rear wheel motor comprises:
determining whether the operation mode of the received operation mode selection information is the first operation mode;
receiving wiring harness wiring connection information for the first operation mode when the operation mode is the first operation mode;
controlling the first motor drive and the second motor drive for driving the front wheel motor based on first wiring harness wiring connection information for driving the front wheel motor in the received wiring harness wiring connection information; and
controlling a third motor drive and a fourth motor drive for driving the rear wheel motor based on second wiring harness wiring connection information for driving the rear wheel motor in the received wiring harness wiring connection information.

14. The control method according to claim 10, wherein the driving of at least one of the front wheel motor and the rear wheel motor comprises:
determining whether the operation mode of the received operation mode selection information is the second operation mode;
receiving wiring harness wiring connection information for the second operation mode when the operation mode is the second operation mode; and
controlling the first motor drive and a second motor drive for driving the front wheel motor based on first wiring harness wiring connection information for driving the front wheel motor in the received wiring harness wiring connection information.

15. The control method according to claim 10, wherein the driving of at least one of the front wheel motor and the rear wheel motor comprises:
determining whether the operation mode of the received operation mode selection information is the third operation mode;
receiving wiring harness wiring connection information for the third operation mode when the operation mode is the third operation mode; and
controlling a third motor drive and a fourth motor drive for driving the rear wheel motor based on second wiring harness wiring connection information for driving the rear wheel motor in the received wiring harness wiring connection information.

16. An electronic parking brake system comprising:
an electronic front-wheel parking brake provided on a front wheel side of a vehicle and configured to be operated by a front wheel motor;
an electronic rear-wheel parking brake provided on a rear wheel side of the vehicle and configured to be operated by a rear wheel motor;
a motor drive configured to drive at least one of the front wheel motor and the rear wheel motor; and
a controller electrically connected to the motor drive, wherein:
the controller receives operation mode selection information in which an operation mode for operating at least one of the electronic front-wheel parking brake and the electronic rear-wheel parking brake is selected, and controls the motor drive to operate at least one of the electronic front-wheel parking brake and the electronic rear-wheel parking brake in response to the operation mode of the received operation mode selection information, the operation mode of the operation mode selection information is a first operation mode for operating the electronic front-wheel parking brake and the electronic rear-wheel parking brake, a second operation mode for operating the electronic front-wheel parking brake, or a third operation mode for operating the electronic rear-wheel parking brake, and the controller is configured to, when the operation mode of the operation mode selection information is the third operation mode, control a third motor drive and a fourth motor drive for driving the rear wheel motor.

* * * * *